United States Patent
Gomadam et al.

(10) Patent No.: US 8,983,002 B2
(45) Date of Patent: Mar. 17, 2015

(54) SYSTEMS AND METHODS FOR ESTABLISHING TRANSMISSION FORMAT PARAMETERS BETWEEN COMMUNICATION DEVICES

(71) Applicant: Broadcom Corporation, Irvine, CA (US)

(72) Inventors: Krishna Srikanth Gomadam, San Jose, CA (US); Djordje Tujkovic, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/831,409

(22) Filed: Mar. 14, 2013

(65) Prior Publication Data

US 2014/0093004 A1  Apr. 3, 2014

Related U.S. Application Data

(60) Provisional application No. 61/709,058, filed on Oct. 2, 2012.

(51) Int. Cl.
*H04L 27/00* (2006.01)
*H04B 7/04* (2006.01)

(52) U.S. Cl.
CPC .................... *H04B 7/0456* (2013.01)
USPC ........... 375/316; 375/259; 375/260; 375/295; 375/299; 375/285; 375/296; 375/346; 375/347; 375/349

(58) Field of Classification Search
CPC .. H04B 7/0639; H04B 7/0456; H04B 7/0417; H04B 7/065; H04B 7/024; H04B 7/0478; H04B 7/0617; H04B 7/0619; H04B 7/0632; H04B 7/0658; H04B 1/38

USPC ......... 375/259, 260, 295, 299, 285, 296, 316, 375/346, 347, 349

See application file for complete search history.

(56) References Cited

U.S. PATENT DOCUMENTS

| | | | | |
|---|---|---|---|---|
| 5,852,630 A | * | 12/1998 | Langberg et al. | 375/219 |
| 2008/0298482 A1 | * | 12/2008 | Rensburg et al. | 375/260 |

(Continued)

FOREIGN PATENT DOCUMENTS

| | | |
|---|---|---|
| EP | 2437408 A1 | 4/2012 |
| EP | 2592763 A2 | 5/2013 |

(Continued)

OTHER PUBLICATIONS

Technical Specification: "LTE: Evolved Universal Terrestrial Radio Access (E-ULTRA) Physical channels and modulation (3GPP TS.211 version 10.0.0 Release 10," ETSI, Jan. 2011, ETSI TS 136 211 v10.0.0.

(Continued)

*Primary Examiner* — Siu Lee
(74) *Attorney, Agent, or Firm* — McDermott Will & Emery LLP

(57) ABSTRACT

Systems and methods for establishing transmission format parameters between communication devices are provided. In some aspects, a method includes identifying, by a first base station, a first communication session with a first user equipment. A master set of transmission format parameters is shared between the first base station and the first user equipment. The method also includes assigning a first subset of the master set of transmission format parameters to the first communication session. The first subset is specifically assigned to the first communication session and specifies which of the master set of transmission format parameters is allocated for use in the first communication session. The method also includes transmitting an indicator of the first subset to the first user equipment.

20 Claims, 5 Drawing Sheets

(56) References Cited

U.S. PATENT DOCUMENTS

| | | |
|---|---|---|
| 2009/0075686 A1 | 3/2009 | Gomadam et al. |
| 2010/0172424 A1 | 7/2010 | Perets et al. |
| 2010/0254474 A1 | 10/2010 | Gomadam et al. |
| 2011/0059703 A1* | 3/2011 | Hugl et al. .................. 455/73 |
| 2011/0150052 A1 | 6/2011 | Erell et al. |
| 2012/0087425 A1 | 4/2012 | Gomadam et al. |
| 2012/0087435 A1 | 4/2012 | Gomadam et al. |
| 2012/0208541 A1* | 8/2012 | Luo et al. .................. 455/437 |
| 2013/0114655 A1* | 5/2013 | Gomadam .................. 375/219 |
| 2013/0163687 A1* | 6/2013 | Jing et al. .................. 375/267 |
| 2013/0272250 A1* | 10/2013 | Shimezawa et al. ......... 370/329 |

FOREIGN PATENT DOCUMENTS

| | | |
|---|---|---|
| GB | 2456217 A | 7/2009 |
| WO | WO-2009/025619 A2 | 2/2009 |

OTHER PUBLICATIONS

Technical Specification: "LTE: Evolved Universal Terrestrial Radio Access (E-ULTRA) Physical layer procedures (3GPP TS 36.213 version 10.3.0 Release 10," ETSI, Oct. 2011, ETSI TS 136 213 v10.3.0.

* cited by examiner

SYSTEMS AND METHODS FOR ESTABLISHING TRANSMISSION FORMAT PARAMETERS BETWEEN COMMUNICATION DEVICES

CROSS-REFERENCES TO RELATED APPLICATIONS

The present application claims the benefit of U.S. Provisional Patent Application Ser. No. 61/709,058, titled "Codebook Indication and Subset Restriction for Long Term Evolution," filed on Oct. 2, 2012, which is hereby incorporated by reference in its entirety for all purposes.

FIELD

The subject technology generally relates to communications and, in particular, relates to systems and methods for establishing transmission format parameters between communication devices.

BACKGROUND

In wireless communications, channel state information (CSI) may refer to channel properties of a communication link between communication devices. This information may describe how a signal propagates from a transmitter to a receiver, and can represent the combined effect of, for example, scattering, fading, and/or power decay with distance between the transmitter and the receiver. The CSI may make it possible to adapt transmissions to current channel conditions, thereby allowing reliable communication to be achieved with high data rates in multi-antenna systems.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
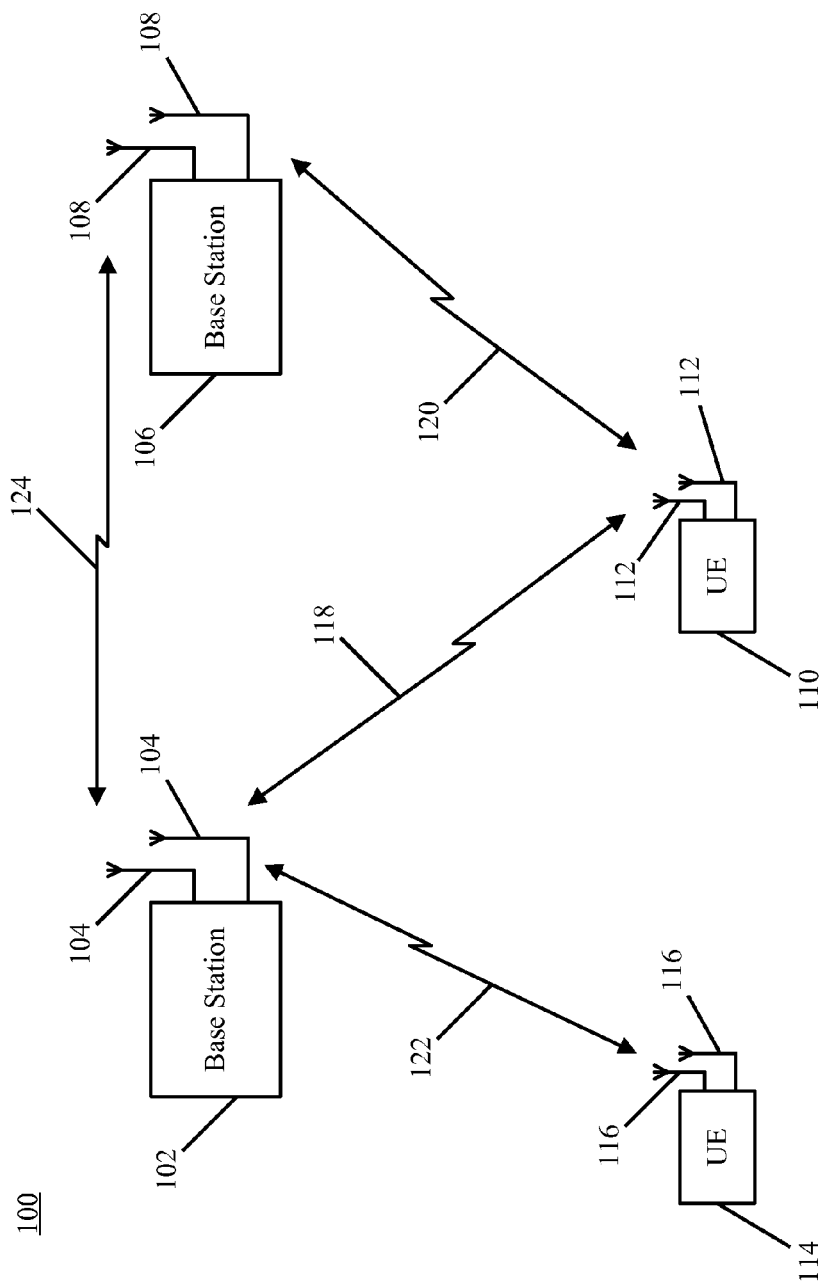
FIG. 1 illustrates an example of a communication system, in accordance with various aspects of the subject technology.

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

A CSI process between two communication devices may allow channel conditions to be determined between the communication devices so that subsequent transmissions between the devices can be configured. A CSI process may involve a mobile communication device receiving one or more downlink signals (e.g., downlink Multiple-Input Multiple-Output (MIMO) signals) from a base station over a communication channel. The mobile communication device may also be referred to as a user equipment (UE). The base station may also be referred to as an evolved node B (eNB), and can include a macrocell, a microcell, a picocell, a femto cell, and/or any other suitable communication device for communicating with the UE. The CSI process may also involve the UE calculating feedback based on the received one or more downlink signals and sending the feedback indicative of the communication channel to the base station. The base station may configure subsequent transmissions with the UE based on the feedback. Channel feedback of this sort is used, for example, in Evolved Universal Terrestrial Radio Access (E-UTRA) systems specified by the 3rd Generation Partnership Project (3GPP). These systems may also be referred to as Long Term Evolution (LTE) and LTE Advanced (LTE-A).

Channel feedback schemes for LTE and LTE-A systems are discussed, for example, in 3GPP Technical Specification Group Radio Access Network Working Group 1 (TSG-RAN WG1) document R1-104473, entitled "Way Forward on 8Tx Codebook for Rel. 10 DL MIMO"; in 3GPP TSG-RAN WG1 document R1-105067, entitled "Way Forward on CSI Feedback for Rel. 10 DL MIMO"; in 3GPP TSG-RAN WG1 document R1-103839, entitled "Design and Evaluation of Precoder Codebooks for CSI Feedback"; in 3GPP TSG-RAN WG1 document R1-104353, entitled "Two-Component PMI Codebook for 8TX"; in 3GPP TS document 36.211, entitled "Evolved Universal Terrestrial Radio Access (E-UTRA); Physical Channels and Modulation"; and in 3GPP TS document 36.213, entitled "Evolved Universal Terrestrial Radio Access (E-UTRA); Physical Layer Procedures," all of which are incorporated by reference herein.

Aspects of the subject technology provide improved channel feedback schemes for use in LTE, LTE-A, and/or any other suitable mobile wireless communication networks. In a CSI process, the one or more downlink signals received by a UE may be precoded with a certain precoding scheme (e.g., a set of weights that can be applied to the base station antennas). Each precoding scheme may be represented by a precoding matrix. In some aspects, the UE may select the preferred precoding matrix from a codebook that is agreed upon between the UE and the base station. The feedback calculated by the UE may be precoding feedback that is indicative of the precoding matrix preferred by the UE for precoding subsequent transmissions by the base station. For example, the precoding feedback may indicate the index of the selected precoding matrix in the codebook. This sort of feedback may sometimes be referred to as Precoding Matrix Indication (PMI). The UE may report the PMI as well as channel quality information (CQI) to the base station.

In LTE Release 10, for example, a codebook for the case of eight base station antennas (8TX) is defined in 3GPP TSG-RAN WG1 document R1-104473, cited above. The codebook may be defined per rank (e.g., per each number of simultaneous data streams (also referred to as spatial streams or spatial layers) that are transmitted from the base station to the UE in the downlink MIMO signal). According to certain aspects, the base station may restrict the codebook to a subset of which the UE may select the PMI from.

Up until LTE Release 10, a UE can receive data (e.g., for a CSI process) from only one base station. However, with the advent of coordinated multipoint (CoMP) in LTE Release 11, each UE can receive data from more than one base station (e.g., up to three base stations). A UE may engage in a different CSI process for each base station (e.g., each UE may be configured with a separate channel state information reference symbol (CSI-RS)). The codebook subset for PMI selection in the current standard may be semi-statically configured by a base station via the 'codebookSubsetRestriction' field in the radio resource control (RRC) 'AntennaInfo' information element (IE). A restriction of the codebook may be defined on a per transmission mode basis and may equally apply to all configured CSI processes. Without a properly configured codebook subset restriction, a UE may report undesirable PMIs from a MU-MIMO pairing and scheduling perspective. To maximize network throughput, aspects of the subject technology provide a mechanism to control UE PMI selection on a per CSI process basis that is not yet available in the standards.

Moreover, in LTE Release 11 and beyond, the UE may be served, on a subframe-by-subframe basis by different base stations. The optimal codebook for each case may depend on the antenna configuration of a given base station. In such a scenario, the feedback overhead per CSI process based on a union of different codebooks may become prohibitive. Furthermore, the CQI computation burden on the UE may increase drastically.

According to various aspects of the subject technology, gains from CoMP can be significantly improved by pairing UEs whose preferred PMIs are largely orthogonal to one another. Such a pairing may reduce co-channel interference amongst co-scheduled UEs and may improve not only network throughput, but also individual UE throughput due to increased scheduling opportunities. However, pairing of UEs based on an extensive search of unrestricted PMI reporting may often times be computationally prohibitive and may not guarantee an optimal solution when a pool of users to choose from is not sufficiently large. According to certain aspects, a more pragmatic approach is to restrict the PMIs that a UE can report for each CSI process. Such a restriction may allow the grouping of users based on close-to-orthogonal PMI sets. As a result, independent optimization based on the traffic conditions of corresponding base stations can be achieved.

In LTE Release 11, aspects of the subject technology can be incorporated by adding a field 'codebookSubsetRestriction' in CSI-RS configuration message CSI-RS-ConFIG. For future releases, such as LTE Release 12 and beyond, multiple sub-codebook designs may be provided, each tailored to a specific antenna configuration to target base stations with different antenna types and spacings. In such a case, the feedback overhead from reporting PMI based on a union of different codebooks may increase drastically. To solve this problem, aspects of the subject technology provide a signaling mechanism for each CSI-RS configuration such that a UE is assigned a particular sub-codebook to use. Since this may be a one-time message, overhead in an uplink can be reduced. This indicator can be over long term or short term, and can be appropriately signaled semi-statically or dynamically.

Another advantage of using a sub-codebook and subset restriction indication per CSI process is the reduction in UE processing, complexity, and/or power consumption. In CoMP, a UE may need to respond to a CQI/PMI request from a base station for up to four CSI processes within a short period of time (e.g., 4 milliseconds). Meeting such a demand may place a lot of stress on peak processing power requirements in the UE implementation (e.g., the UE may need to search through an entire codebook multiple times to find a preferred PMI to report). To minimize this impact, a base station can signal to a UE a sub-codebook and/or a subset restriction that can reduce the search time for PMI selection on each CSI process. Thus, the search for a preferred PMI by a UE can be tailored to the most relevant PMIs. Consequently, the response time from the UE can also be improved, which may result in a more up-to-date feedback for dynamic scheduling. According to certain aspects, the codebook indication and subset restriction by a base station can be, among other things, derived based on the past reporting history for the UE's CSI-RS configuration.

According to certain aspects, the signaling described above can be from a base station to a UE. The codebook subset selection and indication can also be from the UE to the base station to reduce overhead or complexity. That is, the UE can determine which sub-codebook is more suitable for given antenna configurations.

FIG. 1 illustrates an example of communication system 100, in accordance with various aspects of the subject technology. System 100 comprises a first base station 102, a second base station 106, a first UE 110, and a second UE 114 in communication with one another. UE 110 or UE 114 may comprise, for example, a cellular phone, a wireless-enabled mobile computer, or any other suitable type of terminal having communication capabilities. Base station 102 comprises one or more antennas 104 for communicating with base station 106 (e.g., via communication link 124), UE 114 (e.g., via communication link 122), and/or UE 110 (e.g., via communication link 118). Base station 106 also comprises one or more antennas 108 for communicating with UE 110 (e.g., via communication link 120). UE 110 comprises one or more antennas 112 for communicating with base stations 102 and 106 (e.g., for receiving downlink MIMO signals from base station 102 and/or 106 and for transmitting uplink signals to base station 102 and/or 106). UE 114 also comprises one or more antennas 116 for communicating with base station 102 (e.g., for receiving downlink MIMO signals from base station 102 and for transmitting uplink signals to base station 102).

In one or more implementations, system 100 operates in accordance with the LTE-A specifications. In some aspects, however, system 100 may operate in accordance with any other suitable communication protocol. Although system 100 is shown as comprising only two base stations and two user equipment, it is understood that system 100 can comprise any number of base stations and any number of user equipment. For example, UE 110 may communicate with more than two base stations.

According to various aspects of the subject technology, a master codebook (e.g., of precoding matrices) may be shared between base station 102, base station 106, UE 114, and UE 110. Base station 102 may assign a subset of the master codebook to a first communication session between base station 102 and UE 110, and another subset of the master codebook to a second communication session between base station 102 and UE 114. In some aspects, the subset assigned to the first communication session may be orthogonal to the subset assigned to the second communication session, thereby minimizing interference between the first and second communication sessions. Base station 106 may also assign another subset of the master codebook to a third communication session between base station 106 and UE 110. By assigning subsets of the master codebook to the communication sessions with UE 110 and/or UE 114, the search for preferred PMIs by UE 110 and/or UE 114 can be reduced (e.g., since UE 110 and/or UE 114 may only need to search through the respective subsets as opposed to the entire master codebook).

Although a master codebook is described herein, other transmission format parameters may be shared between communication devices, and a subset of any one of the transmission format parameters may be assigned to any of the communication sessions between the communication devices. In some aspects, transmission format parameters that may be shared between the communication devices include a master codebook, one or more rank indications, one or more modulation schemes, one or more encoding types, one or more rates, and/or other suitable parameters that may be assigned to communication sessions between the communication devices. In some aspects, the one or more modulation schemes can include Quadrature Phase Shift Keying (QPSK), Quadrature Amplitude Modulation (QAM), a modulation with coding scheme (e.g., error correction code), and/or any other suitable modulation scheme.

Figure 2:
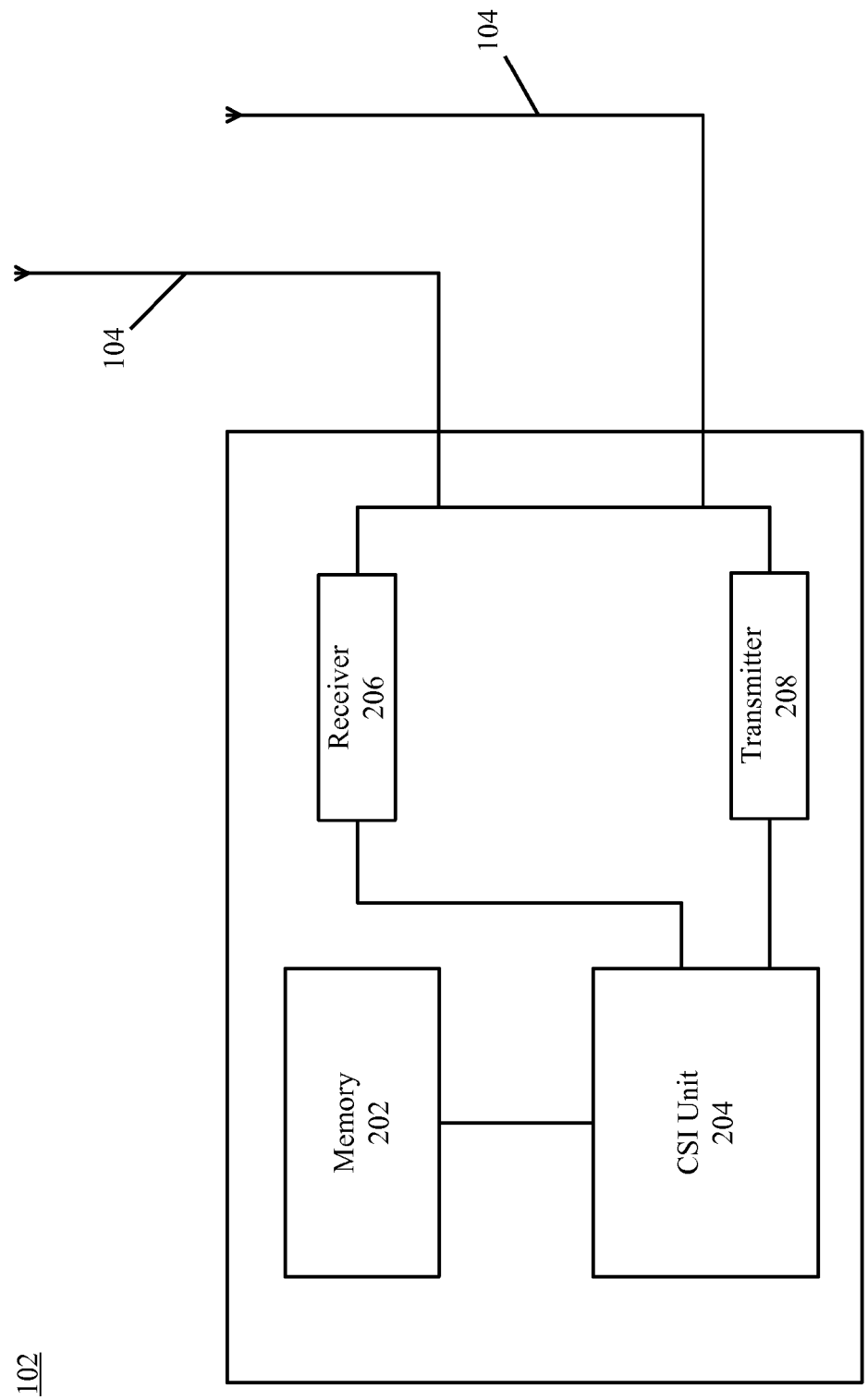
FIG. 2 is a block diagram that schematically illustrates a base station, in accordance with various aspects of the subject technology.

FIG. 2 is a block diagram that schematically illustrates base station 102, in accordance with various aspects of the subject technology. Base station 102 comprises memory 202, channel state information (CSI) unit 204 coupled to memory 202, receiver 206 coupled to CSI unit 204, transmitter 208 coupled to CSI unit 204, and one or more antennas 104 coupled to receiver 206 and transmitter 208. Receiver 206 may receive signals from other communication devices (e.g., base station 106, UE 114, and/or UE 110), and transmitter 208 may transmit signals to the other communication devices. Memory 202 may store the master codebook and/or other transmission format parameters. CSI unit 204 may assign subsets of the master codebook to different communication sessions with different user equipment. According to certain aspects, the configuration of base station 106 may be the same or similar to the configuration of base station 102 shown in FIG. 2.

Figure 3:
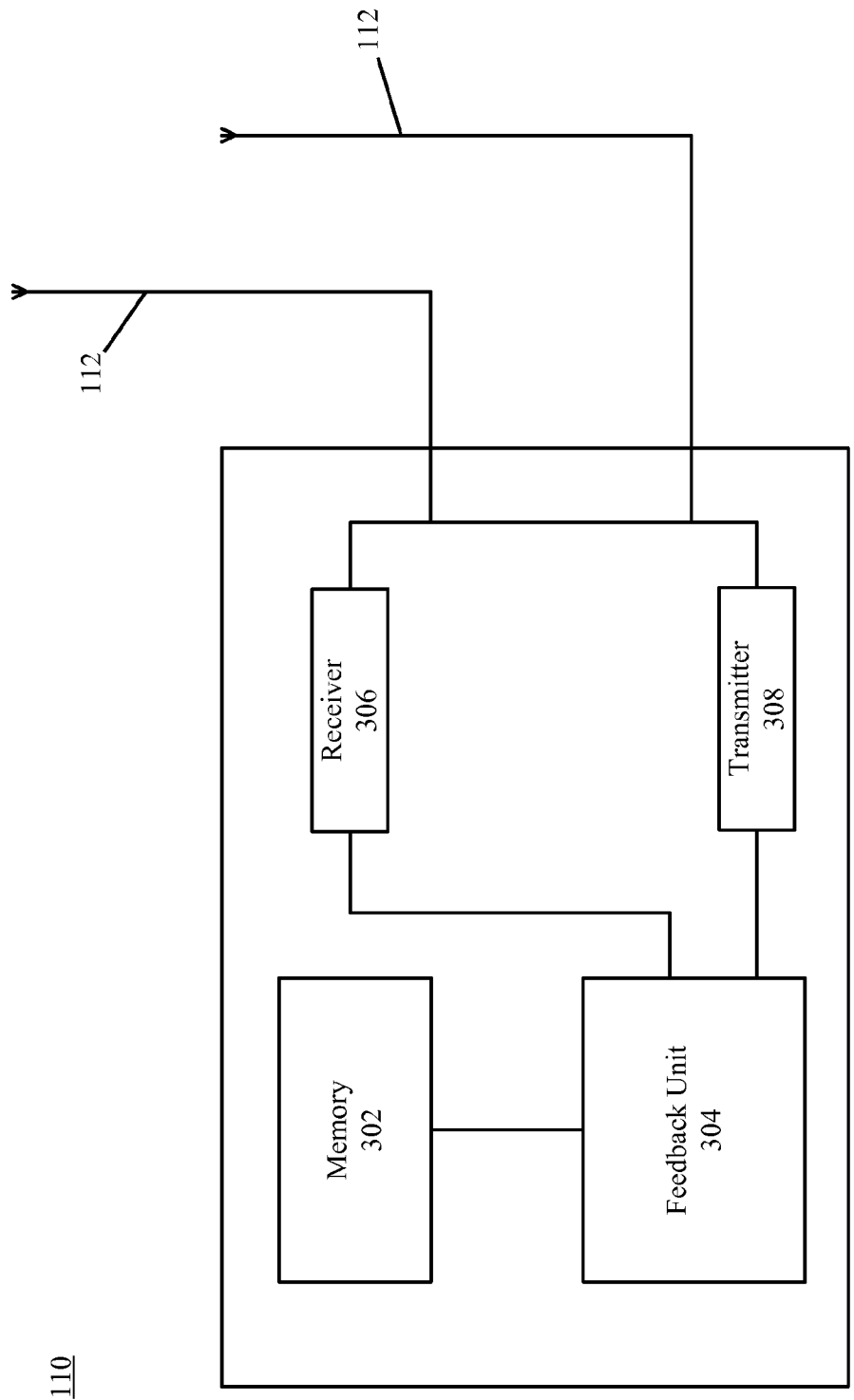
FIG. 3 is a block diagram that schematically illustrates a user equipment, in accordance with various aspects of the subject technology.

FIG. 3 is a block diagram that schematically illustrates UE 110, in accordance with various aspects of the subject technology. UE 110 comprises memory 302, feedback unit 304 coupled to memory 302, receiver 306 coupled to feedback unit 304, transmitter 308 coupled to feedback unit 304, and one or more antennas 112 coupled to receiver 306 and transmitter 308. Receiver 306 may receive signals from other communication devices (e.g., base station 102, base station 106, and/or UE 114) and transmitter 308 may transmit signals to the other communication devices. Memory 302 may store the master codebook and/or other transmission format parameters. Feedback unit 304 may generate feedback data based on subsets of the master codebook assigned to different communication sessions that UE 110 is engaged in with base station 102 and/or base station 106. According to certain aspects, the configuration of UE 114 may be the same or similar to the configuration of UE 110 shown in FIG. 3.

According to certain aspects, the components of base station 102 and/or UE 110 as shown in FIGS. 2 and 3, respectively, may be implemented in software (e.g., subroutines and code). In some aspects, some or all of the components may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these components according to various aspects of the subject technology are further described in the present disclosure.

Figure 4:
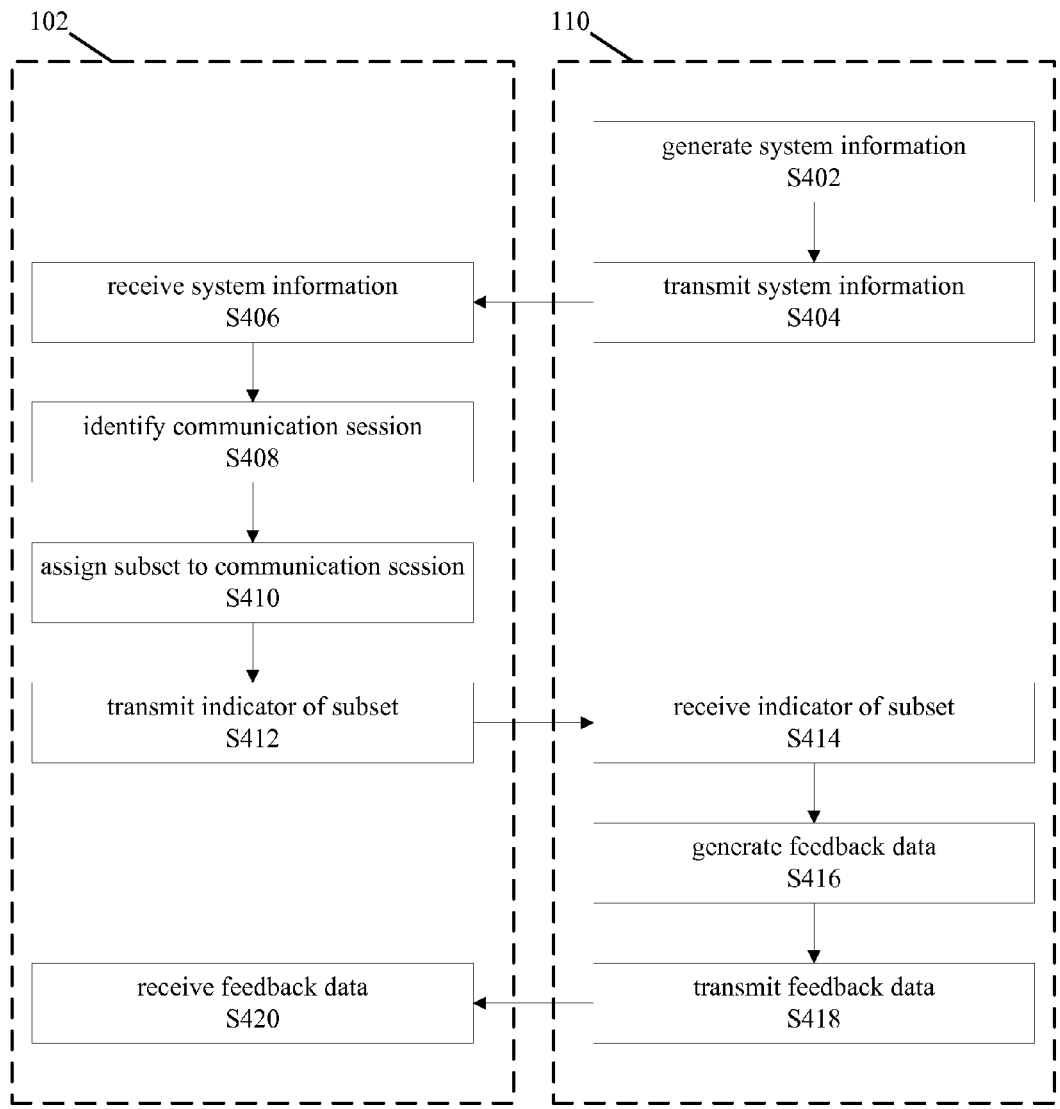
FIG. 4 illustrates an example of a method for establishing transmission format parameters between communication devices, in accordance with various aspects of the subject technology.

FIG. 4 illustrates an example of method 400 for establishing transmission format parameters between communication devices, in accordance with various aspects of the subject technology. Method 400 may be implemented by base station 102 and/or UE 110 when these communication devices are engaged in a first communication session with one another. However, method 400 may also be implemented by communication devices having other configurations. Although method 400 is described herein with reference to the examples of FIGS. 1-3, method 400 is not limited to these examples. Furthermore, method 400 may be implemented in an order different from the one shown in FIG. 4.

Method 400 comprises processes S402, S404, S406, S408, S410, S412, S414, S416, S418, and S420. Processes S402, S404, S414, S416, and S418 may be implemented by UE 110, and therefore are shown in FIG. 4 as being within UE 110. Processes S406, S408, S410, S412, and S420 may be implemented by base station 102, and therefore are shown in FIG. 4 as being within base station 102. Although the processes implemented by UE 110 and base station 102 are described as being part of method 400, the processes implemented by UE 110 may, in certain aspects, be considered a separate method from the processes implemented by base station 102.

According to various aspects of the subject technology, UE 110 generates system information that can be used to assist base station 102 in determining what subset of the master codebook to assign to a first communication session between UE 110 and base station 102 (S402). In one or more implementations, feedback unit 304 of UE 110 generates the system information. The system information may include at least one of capability information of UE 110 and preference information of UE 110. The capability information may include a maximum number of precoding matrices of the master codebook that the UE 110 is capable of searching through at a given time. The preference information may include one or more preferred ones of the master set of transmission format parameters. Transmitter 308 of UE 110 transmits the system information to base station 102 (S404).

Receiver 206 of base station 102 receives the system information from UE 110 (S406). According to certain aspects, CSI unit 204 of base station 102 identifies the first communication session that base station 102 and UE 110 are engaged in (S408). In some aspects, the system information may be transmitted by UE 110 as part of a request by UE 110 to initiate the first communication session with base station 102. In some aspects, base station 102 may initiate the first communication session with UE 110, and/or may request the system information from UE 110 prior to process S402. The first communication session, for example, may include a CSI process between base station 102 and UE 110. In one or more implementations, the CSI process may include base station 102 transmitting a subset of the master codebook to UE 110, UE 110 generating feedback data based on the subset, and UE 110 transmitting the feedback data to base station 102.

According to various aspects of the subject technology, CSI unit 204 of base station 102 assigns a first subset of the master codebook (e.g., stored in memory 202) to the identified first communication session (S410). In one or more implementations, the first subset is specifically assigned to the first communication session (e.g., base station 102 may assign a new subset of the master codebook to each new communication session that base station 102 engages in). The first subset, for example, may specify which precoding matrices of the master codebook are allocated for use in the first communication session. In some aspects, the first subset comprises a subset of the precoding matrices of the master codebook. In some aspects, the first subset consists of a single one of the precoding matrices. In such a situation, base station 102 is assigning a specific precoding matrix for UE 110 to use in the first communication session.

There may be different ways that CSI unit 204 determines which subset to assign to the first communication session. In some aspects, CSI unit 204 may determine the first subset for the first communication session independent of another subset determined for another communication session. Although independently determined, the first subset may nevertheless be the same as another subset determined for another communication session or may be different from another subset determined for another communication session.

According to certain aspects, CSI unit 204 determines the first subset based on information from other communication sessions, subsets, and/or other communication devices. In one or more implementations, CSI unit 204 determines to assign the first subset to the first communication session based on the system information received from UE 110. For example, if the system information indicates that UE 110 is only capable of searching through a limited number of precoding matrices, then CSI unit 204 may assign only a number of precoding matrices up to that limited number as part of the first subset. In another example, if the system information indicates that UE 110 prefers certain one or more precoding matrices, CSI unit 204 may assign the preferred one or more precoding matrices as part of the first subset.

In some aspects, CSI unit 204 may observe a previous history of communication with UE 110 and determine which precoding matrices of the master codebook it should assign to the first communication session based on the history. In one or more implementations, CSI unit 204 may determine the first subset based on a previous subset of the master codebook assigned to a previous communication session between base station 102 and UE 110. For example, if use of the previous subset resulted in optimized communications between base station 102 and UE 110, CSI unit 204 may determine the first subset to be the same or similar to the previous subset.

In some aspects, CSI unit 204 may determine the first subset based on a second subset of the master codebook that is assigned by CSI unit 204 to a second communication session between base station 102 and UE 114. In such a situation, for example, CSI unit 204 may determine the first subset such that interference between the first communication session and the second communication session can be reduced (e.g., the first subset may be selected to be orthogonal to the second subset). In one or more implementations, if the master codebook is comprised of 16 precoding matrices, the first subset may include precoding vectors that are orthogonal to the precoding vectors of the second subset. In some aspects, CSI unit 204 may determine the first subset based on a distance between UE 110 and UE 114. For example, the greater the distance between UE 110 and UE 114, the less concerned that CSI unit 204 may be with interference between the first communication session and the second communication session.

In some aspects, CSI unit 204 may determine the first subset based on a third subset of the master codebook that is assigned by base station 106 to a third communication session between base station 106 and UE 110. In such a situation, for example, CSI unit 204 of base station 102 may determine the first subset such that interference between the first communication session and the third communication session can be reduced (e.g., the first subset may be selected to be orthogonal to the third subset). In some aspects, CSI unit 204 may determine the first subset based on a distance between base station 102 and base station 106. For example, the greater the distance between base station 102 and base station 106, the less concerned that CSI unit 204 may be with interference between the first communication session and the third communication session. According to certain aspects, base station 106 and base station 102 may communicate relevant information (e.g., distance information, subset information, etc.) between one another via communication link 124, as shown in FIG. 1. In some aspects, a separate central system (e.g., a central server) that is connected to both base stations 102 and 106 can facilitate the transfer of the relevant information between base stations 102 and 106.

According to certain aspects, CSI unit 204 may generate an indicator of the first subset. The indicator, for example, may be a signal that can be transmitted to UE 110 to inform UE 110 what the first subset is (e.g., so that UE 110 may generate feedback based on the first subset). According to certain aspects, subsets of the master codebook may be predetermined between base station 102 and UE 110. For example, if the master codebook is comprised of 16 precoding matrices, the 16 precoding matrices may be divided into four groups of four precoding matrices each. In one or more implementations, base station 102 and UE 110 may have knowledge of how the master codebook is divided prior to initiation of the first communication session. The first subset may be determined to be any one of the four groups. Thus, the indicator of the first subset may convey which of the four groups is assigned to the first communication session as the first subset.

Since the indicator only has to convey which of the groups of the master codebook is selected, and not which specific precoding matrix from the entire master codebook is selected, a memory size of the indicator of the first subset can be less than a minimum memory size needed to communicate a selection of a specific precoding matrix from the master codebook. For example, if the master codebook is comprised of 16 precoding matrices, a minimum of four bits may be needed to convey a selection from the master codebook. However, if the 16 precoding matrices of the master codebook are divided into four groups of four precoding matrices each, then a minimum of only two bits may be needed to convey which of the four groups is assigned to the first communication session as the first subset. Thus, in this example, a memory size of the indicator of the first subset may only need to be two bits as opposed to four bits, thereby reducing the bandwidth needed to convey to UE 110 what subset of the master codebook is assigned to the first communication session.

According to certain aspects, transmitter 208 of base station 102 transmits the indicator of the first subset to UE 110 (S412). In some aspects, the indicator of the first subset is transmitted to UE 110 as part of one or more reference signals (e.g., Common Reference Signals (CRS) in LTE systems, and Channel State Information Reference Signals (CSI-RS) in LTE-A systems).

Receiver 306 of UE 110 receives the indicator of the first subset (S414). According to certain aspects, receiver 306 may also receive indicators of subsets from other communication sessions. For example, receiver 306 may receive an indicator of the second subset from base station 102 for the second communication session and/or an indicator of the third subset from base station 106 for the third communication session.

According to certain aspects, feedback unit 304 of UE 110 generates first feedback data based on the first subset (e.g., as determined from the received indicator of the first subset) (S416). In one or more implementations, the first feedback data is directed to downlink communication channels between the one or more antennas 104 of base station 102 and the one or more antennas 112 of UE 110. In some aspects, feedback unit 304 calculates the first feedback data based on the one or more reference signals received from base station 102. The first feedback data may include a selection of one of the precoding matrices from the first subset (e.g., to inform base station 102 of a preferred precoding scheme). If the first feedback data consists of a single one of the precoding matrices, the first feedback data may include confirmation of use of the single one of the precoding matrices.

According to certain aspects, a memory size of the selection of one of the subset of precoding matrices may be less than a minimum memory size needed to communicate a selection of the precoding matrices from the master codebook. This is because the selection is made from only a subset of the master codebook as opposed to a selection from the entire master codebook. For example, if the master codebook is comprised of 16 precoding matrices, four bits may be needed to make a selection from any one of the 16 precoding matrices. However, if the first subset is comprised of only four of the 16 precoding matrices, only two bits may be needed to make a selection from any one of the four precoding matrices. According to certain aspects, since UE 110 may transmit this selection to base station 102 over a Physical Uplink Control Channel (PUCCH), which has only a limited number of bits for allocating to feedback data, the reduced memory size of the selection allows for a reduction in the feedback bandwidth.

According to certain aspects, transmitter 308 of UE 110 may transmit the first feedback data to base station 102 (S418). Receiver 206 of base station 102 receives the first feedback data from UE 110 (S420). According to one or more implementations, CSI unit 204 may decode the first feedback data and use this data to decide on the precoding of subsequent downlink transmissions to UE 110. For example, CSI unit 204 may select one or more precoding matrices from the master codebook based on the received first feedback data. For subsequent communications with UE 110, base station 102 may communicate with UE 110 using the selected one or more precoding matrices.

According to various aspects, some or all of method 400 may be repeated for each new communication session engaged in by base station 102 and/or UE 110. In one or more implementations, base station 102 may repeat processes S406, S408, S410, S412, and/or S420 for each new communication session that base station 102 engages in. For example, base station 102 may receive new system information from UE 110 (or another user equipment), identify the new communication session with UE 110, assign a new subset to the new communication session, transmit an indicator of the new subset to UE 110, and/or receive new feedback data that is generated by UE 110 based on new assigned subset.

In one or more implementations, UE 110 may repeat processes S402, S404, S414, S416, and/or S418 for each new communication session that UE 110 engages in. For example, UE 110 may generate new system information, transmit the new system information to base station 102 (or another base station), receive an indicator of a new subset assigned to the new communication session, generate new feedback based on new assigned subset, and/or transmit the new feedback data to base station 102.

Furthermore, as discussed above, although a master codebook is described herein, other transmission format parameters may be shared between base station 102 and UE 110, and a subset of any one of the transmission format parameters may be assigned to any of the communication sessions between these communication devices (e.g., in a similar manner as discussed with respect to method 400).

Figure 5:
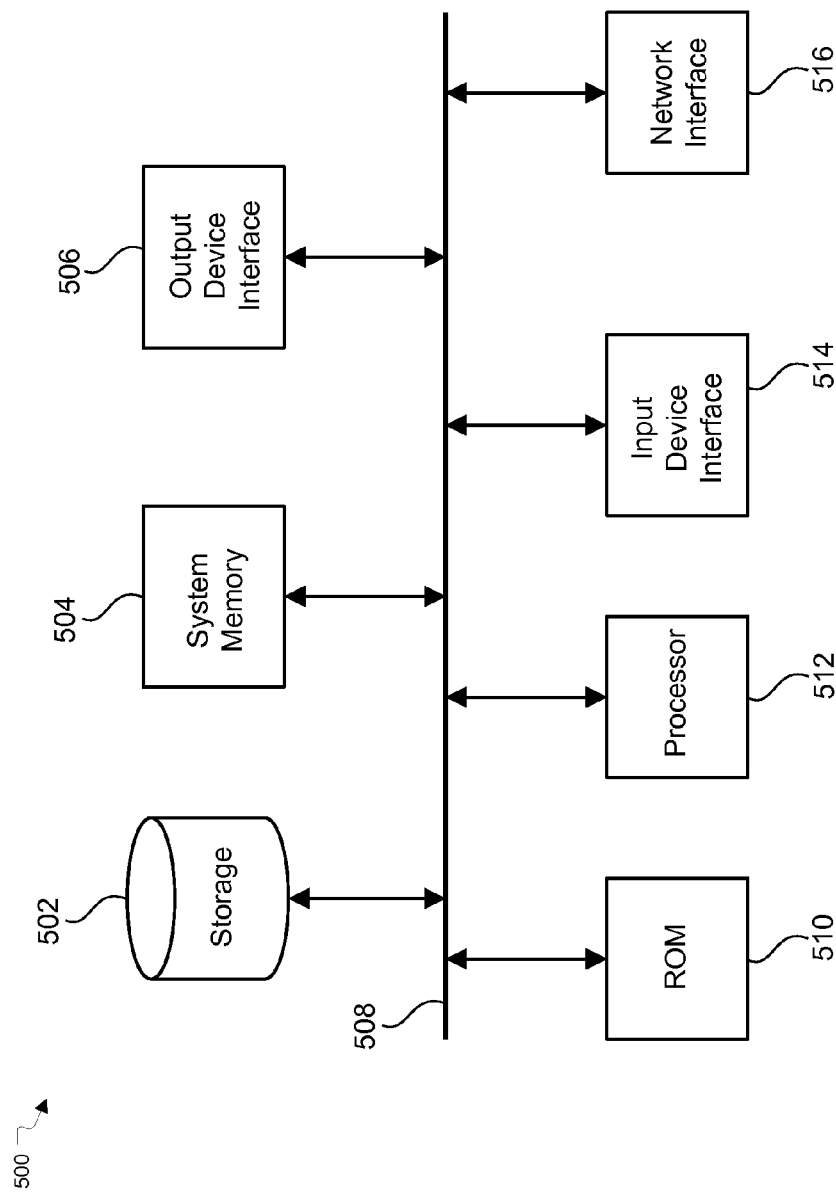
FIG. 5 conceptually illustrates an electronic system with which implementations of the subject technology may be implemented.

FIG. 5 conceptually illustrates electronic system 500 with which implementations of the subject technology may be implemented. Electronic system 500, for example, can be a desktop computer, a laptop computer, a tablet computer, a server, a switch, a router, a base station, a receiver, a phone, a personal digital assistant (PDA), any device for establishing transmission format parameters, or generally any electronic device that transmits signals over a network. Such an electronic system includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and network interface 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for establishing transmission format parameters between communication devices, the method comprising:
   receiving, by a first user equipment, a first indicator of a first subset of a master set of transmission format parameters from a first base station, wherein the master set of transmission format parameters is shared between the first base station and the first user equipment, wherein the first subset is specifically assigned to a first communication session between the first user equipment and the first base station, and wherein the first subset specifies which subset of the master set of transmission format parameters is allocated for use in the first communication session;
   generating first feedback data based on the first subset;
   transmitting the first feedback data to the first base station; and
   receiving, by the first user equipment, a second indicator of a second subset of the master set of transmission format parameters, wherein the second subset is assigned by the first base station upon initiation of a second communication session between the first base station and the first user equipment and the second subset is specifically assigned to the second communication session, wherein the second subset specifies which subset of the master set of transmission format parameters is allocated for use in the second communication session, and wherein the first subset and the second subset are assigned independently of one another.

2. The method of claim 1, wherein the master set of transmission format parameters comprises precoding matrices, the first subset comprises a subset of the precoding matrices, and wherein the first feedback data comprises a selection of one of the subset of the precoding matrices.

3. The method of claim 1, wherein the first subset is assigned based on at least one of a previous subset of the master set of transmission format parameters assigned to a previous communication session between the first base station and the first user equipment, a third subset of the master set of transmission format parameters assigned by a second base station to a third communication session with the first user equipment, a distance between the first base station and the second base station, a fourth subset of the master set of transmission format parameters assigned by the first base station to a fourth communication session with a second user equipment, a distance between the first user equipment and the second user equipment, and system information of the first user equipment.

4. The method of claim 1, further comprising:
   generating system information of the first user equipment; and
   transmitting the system information to the first base station.

5. The method of claim 4, wherein the system information comprises at least one of capability information and preference information, the capability information comprising a maximum number of the master set of transmission format parameters that the first user equipment is capable of searching through at a given time, the preference information comprising one or more preferred ones of the master set of transmission format parameters.

6. The method of claim 1, further comprising receiving a third indicator of a third subset of the master set of transmission format parameters, wherein the third subset is assigned, by a second base station, to a third communication session between the second base station and the first user equipment, wherein the third subset specifies which subset of the master set of transmission format parameters is allocated for use in the third communication session, and wherein the first subset, the second subset, and the third subset are assigned independently of one another.

7. The method of claim 1, wherein the first feedback data comprises a selection from the first subset, and wherein a memory size of the selection from the first subset is less than a minimum memory size needed to communicate a selection from any one of the master set of transmission format parameters.

8. The method of claim 1, further comprising repeating (i) the receiving with an indicator of a new subset of the master set of transmission format parameters assigned to each new communication session engaged in by the first user equipment, (ii) the generating with new feedback data for each new assigned subset, and (iii) the transmitting with each new feedback data.

9. A device comprising:
   a memory; and
   at least one processor circuit configured to:
      receive a first indicator of a first subset of a master set of transmission format parameters, the first subset being assigned to a first communication session with a first base station;
      generate first feedback data based on the first subset;

transmit the first feedback data to the first base station; and receive a second indicator of a second subset of the master set of transmission format parameters, wherein the second subset is assigned, by a second base station, to a second communication session with the second base station, wherein the second subset specifies which subset of the master set of transmission format parameters is allocated for use in the second communication session, and wherein the first subset and the second subset are assigned independently of one another.

10. The device of claim 9, wherein the master set of transmission format parameters is shared between the first base station and the device, and the first subset specifies which subset of the master set of transmission format parameters is allocated for use in the first communication session.

11. The device of claim 9, wherein the master set of transmission format parameters comprises at least one of a master codebook, one or more rank indications, one or more modulation schemes, one or more encoding types, or one or more rates.

12. The device of claim 11, wherein the master codebook comprises precoding matrices, the first subset comprises a subset of the precoding matrices, and the first feedback data comprises a selection of one of the subset of the precoding matrices.

13. The device of claim 9, wherein the first subset is assigned based on at least one of a previous subset of the master set of transmission format parameters assigned to a previous communication session between the first base station and the device, a third subset of the master set of transmission format parameters assigned by the second base station to a third communication session with the device, a distance between the first base station and the second base station, a fourth subset of the master set of transmission format parameters assigned by the first base station to a fourth communication session with another device, a distance between the device and the another device, or system information of the device.

14. The device of claim 9, wherein the at least one processor circuit is further configured to:
generate system information of the device; and
transmit the system information to the first base station.

15. The device of claim 14, wherein the system information comprises at least one of capability information or preference information, the capability information comprising a maximum number of the master set of transmission format parameters that the device is capable of searching through at a given time, the preference information comprising one or more preferred ones of the master set of transmission format parameters.

16. The device of claim 9, wherein the at least one processor circuit is further configured to:
receive a third indicator of a third subset of the master set of transmission format parameters, wherein the third subset is assigned, by the first base station, to a third communication session between the first base station and the device, wherein the third subset specifies which subset of the master set of transmission format parameters is allocated for use in the third communication session, and wherein the first subset, the second subset, and the third subset are assigned independently of one another.

17. The device of claim 9, wherein the first feedback data comprises a selection from the first subset, and wherein a memory size of the selection from the first subset is less than a minimum memory size needed to communicate a selection from any one of the master set of transmission format parameters.

18. The device of claim 9, wherein the at least one processor circuit is further configured to:
repeat (i) receiving a new indicator of a new subset of the master set of transmission format parameters assigned to each new communication session engaged in by the device, (ii) generating new feedback data for each new assigned subset, and (iii) transmitting each new feedback data.

19. A computer program product comprising instructions stored in a tangible non-transitory computer-readable storage medium, the instructions comprising:
instructions for transmitting system information of a device to a first base station;
instructions for receiving an indicator of a first subset of a master set of transmission format parameters from the first base station, wherein the first subset is specifically assigned to a first communication session with the first base station and the first subset specifies which subset of the master set of transmission format parameters is allocated for use in the first communication session, and wherein the first subset is assigned to the first communication session by the first base station based at least in part on the system information of the device;
instructions for generating first feedback data based on the first subset; and
instructions for transmitting the first feedback data to the first base station.

20. The computer program product of claim 19, wherein the system information comprises at least one of capability information or preference information, the capability information comprising a maximum number of the master set of transmission format parameters that the device is capable of searching through at a given time, the preference information comprising one or more preferred ones of the master set of transmission format parameters.

* * * * *